United States Patent [19]

Every et al.

[11] 4,428,866

[45] Jan. 31, 1984

[54] COMPOSITION FOR REDUCING FLY ASH RESISTIVITY

[75] Inventors: Richard L. Every, Lake Zurich; Franklin D. Lewandowski, Grayslake; Jerome F. Lech, Crystal Lake, all of Ill.

[73] Assignee: Dearborn Chemical Company, Lake Zurich, Ill.

[21] Appl. No.: 409,686

[22] Filed: Aug. 19, 1982

Related U.S. Application Data

[62] Division of Ser. No. 25,327, Mar. 30, 1979, Pat. No. 4,352,747.

[51] Int. Cl.$^3$ .............................................. G01B 1/00
[52] U.S. Cl. ...................................... 252/500; 110/345
[58] Field of Search ...................... 252/500, 518, 182; 110/103, 234, 341, 342, 345; 122/7 R; 423/228, 242, 242 R, 243, 244 R, 245; 422/9; 44/72, 76; 35/1, 5, 11, 262

[56] References Cited

U.S. PATENT DOCUMENTS

| | | | |
|---|---|---|---|
| 4,070,162 | 1/1978 | Kober et al. | 423/215.5 X |
| 4,185,071 | 1/1980 | Suyak | 252/392 |
| 4,224,180 | 9/1980 | Suyak | 252/392 |

Primary Examiner—Josephine Barr

[57] ABSTRACT

A mixture of an alkyl amine, e.g., tri-n-propylamine and an $SO_3$-containing acid, preferably, sulfamic acid is injected into the flue gas stream of a coal-fired utility boiler to reduce the electrical resistivity of the fly-ash particles and to increase their mean particle size, thereby improving their recovery by electrostatic precipitation or by mechanical separation, with consequent reduction in stack emission.

2 Claims, No Drawings

COMPOSITION FOR REDUCING FLY ASH RESISTIVITY

This is a division of application Ser. No. 25,327, filed Mar. 30, 1979, now U.S. Pat. No. 4,352,747.

The invention is directed to the reduction of electrical resistivity of, and increase in mean particle size of fly-ash particles in utility boilers, thereby improving fly-ash collection with concomitant reduction in stack emissions. This is done by injecting an amine and an $SO_3$-containing acid, e.g., sulfuric or sulfamic acid, separately or together, into the cold end of the boiler, between the heat exchangers and the fly-ash collecting system.

Prior art systems have added amines and ammonium sulfate or sulfuric acid to boilers, but this addition has been in the hotter zones of the boiler, i.e., before the air preheater and other heat exchangers, with attendant deposition of additive on the heat exchangers. The instant invention distinguishes from prior practice primarily in that it calls for addition in the cold part of the boiler, after all heat exchangers, at 300°–500° F., before the electrostatic precipitators or mechanical collectors.

One conventional way of collecting dust particles from a furnace gas stream in which the particles are entrained is by the use of an electrostatic precipitator. This equipment separates particles from a gas stream by passing the stream through an electric field, thereby attracting the charged particles to a collector plate. The particles are then removed from the plate by mechanical vibration or rapping the plate. There are a number of variables that can adversely affect the removal of fly ash by an electrostatic precipitator. Many of these variables can be eliminated by mechanical means, e.g., correction of poor gas distribution or by improved mechanical rapping to keep precipitator collection surfaces in a cleaner condition. However, chemical means of control have been utilized primarily as resistivity modifiers. Sulfur trioxide, ammonium sulfate and bisulfate, ammonia, and sulfamic acid are some of the most common additives for this purpose.

Mechanical collecting systems such as cyclone separators are also utilized to separate dust particles from a furnace gas stream. In this case, the resistivity plays a minor role in determining the efficiency of the separation. Size and density of the particles are most important.

This invention is effective for both types of separating systems.

Whereas fly-ash resistivity is the most significant factor governing fly-ash precipitation, particle size also plays an important role. Particles in the 10 micron range and above give more efficient operation than smaller sized particles. Larger particles are more readily centrifuged from the flue gas stream than smaller particles. The modification of the fly-ash resistivity when necessary is the basis of this invention.

The amine component has the formula

$R_1$, $R_2$, and $R_3$ are independently selected from the group consisting of H and alkyl groups having 1–8 carbons, at least one of the substituents being alkyl. The amine can be gaseous, liquid, or solid. If gaseous, it is conveniently added to the boiler by a gas injection tube, or it can be converted to the sulfate or sulfamate salt in the known way, and added either as a finely divided solid through a tube in the boiler wall, using conventional solids additions means, or as an aqueous solution of the salt. If a liquid, it can be injected as such, or used in the salt form, as above described. If a solid, it can be added through a solids addition tube or in aqueous solution, as above. Our preferred composition is an aqueous solution of the amine with sulfuric or sulfamic acid, suitably 6 to 8 parts of water per part of actives, i.e., combined amine and acid.

The acid component is an $SO_3$-containing acid, e.g., sulfuric acid or sulfamic acid. This component can be added separately from the amine, e.g., via liquid spray injection or (in the case of sulfamic acid) via a solids addition tube. However, as above noted, it is preferred to neutralize the acid with the amine, in aqueous solution, and to inject the latter as a spray into the furnace. This mode facilitates handling and metering.

The $SO_3$-containing acid may also be present partially or wholly in the form of its ammonium salts, all of which are highly acidic, e.g. ammonium sulfate or sulfamate, or ammonium bisulfate.

The invention is also directed to a novel composition consisting essentially of an aqueous solution of the tri-n-propylamine salt of sulfamic acid, operably in a weight ratio of about 0.25 to 1 parts of amine per part of acid, and preferably about one part of amine per part of acid. The amount of water is not critical. A useful amount is 6 to 8 parts by weight of water per part of amine plus acid; and preferably, about 7 parts of water per part of amine plus acid.

Our novel composition is especially useful in boilers using low sulfur coal, since these fuels typically generate a fly ash whose resistivity is too high and whose particle size is too small for effective removal by collection devices, absent treatment.

The crux of this invention involves the injection of the amine and $SO_3$-containing acid into the furnace at a relatively low temperature, i.e., 300°–500° F. This is a relatively "cold" area of the flue, between the heat exchangers (e.g., air preheater, economizer, etc.) and the fly-ash collectors and therefore there is no risk of deposit of the additive on heat exchangers.

The following examples illustrate without limiting the invention.

EXAMPLE 1

These were runs using laboratory testing equipment. The equipment comprised an insulated steel sheet metal frusto-conical chamber, about 5½ inches high, with the small end at the top, the small end having an opening of 8½ inches, and the base being about 8¾ inches in diameter. The chamber sits on a porcelain tray, which holds the fly-ash sample. A spray nozzle is located just within the 1½ inch outlet for spraying the test chemical(s) into the chamber, and thence down on the ash. The outside of the chamber is heated by means of an electrical heater. After the treatment (about 15 minutes) the chamber is allowed to cool. It is then removed, the ash is collected, and its resistivity is tested according to ASME method PTC-28, 4.05 at 300° F. and 5% relative humidity. In the following runs, about 50 g. of fly ash from a furnace that used Eastern bitiminous coal was placed on the tray. The chamber was heated to 450° F., which is typical of the temperature range between the heat exchangers and the electrostatic precipitator in a commercial utility boiler. The following results were obtained.

| Chemical | Dosage (g/g of ash) | Resistivity (ohm-cm) |
| --- | --- | --- |
| None | — | $4.79 \times 10^{11}$ |
| $H_2O$ | 0.20 | $2.30 \times 10^{11}$ |
| Tri-n-propylamine | 0.038 | $1.69 \times 10^{11}$ |
| Tri-n-propylamine | 0.012 | $5.30 \times 10^{11}$ |
| Tri-n-propylamine | 0.140 | $1.53 \times 10^{11}$ |
| Sulfamic acid | 0.012 | $2.50 \times 10^{12}$ |
| Mix[1] | 0.200 | $9.95 \times 10^{10}$ |

[1] 88% Water, 6% Sulfamic Acid and 6% Tri-n-propylamine. Thus sulfamic acid was 0.012 and tri-n-propylamine was 0.012, g/g ash.

It is evident that the mix gave a significant decrease in resisitivity, compared to the control and to the individual components.

EXAMPLE 2

The fly ash generated at a commercial boiler burning Eastern type (bituminous) pulverized coal, with 2.2% to 2.5% sulfur was treated with the mix of Example 1. The boiler was rated to generate 400,000 pounds per hour of steam at 900° F. and 425 psi.

The temperature at the point of injection in the furnace was about 400° F. and was after the air-heaters. Injection was by means of spray nozzles.

The following table contains data obtained on fly ash before and after treatment.

| Treatment Dosage (gal/ton of coal) | Resistivity (ohm-cm) | Mean Particle Size ($\mu$) |
| --- | --- | --- |
| — | $4.79 \times 10^{11}$ | 13.1 |
| 0.1 | $4.61 \times 10^{10}$ | 13.2 |
| 0.25 | $6.49 \times 10^{9}$ | 16.1 |

It can be seen that the additive had a positive effect on both the resistivity and particle size of the fly ash.

Operably, the additive (anhydrous, active basis, amine plus acid) is added at the rate of about 0.05 to 0.70 pounds per short ton of coal. Preferably the rate is about 0.10 to 0.30 pounds per short ton and even more preferably, about 0.26 pounds/ton. Operably, the weight ratio of amine:$SO_3$-containing acid is about 0.5 to 1:1. Preferably, it is about 0.8 to 1:1, and even more preferably about 1:1. When the actives are used in water solution, operably the weight of water to actives is respectively about 5 to 10:1. Preferably it is about 6 to 8:1, and even more preferably about 7:1.

We claim:

1. Composition of matter for reducing fly ash resistivity consisting essentially of equal parts by weight of tri-n-propylamine and sulfamic acid in aqueous solution.

2. Composition according to claim 1 consisting essentially of about 6% tri-n-propylamine, 6% sulfamic acid, and 88% water.

* * * * *